United States Patent
Kizawa et al.

(10) Patent No.: US 8,174,246 B2
(45) Date of Patent: May 8, 2012

(54) VEHICLE POWER GENERATION CONTROLLING DEVICE AND VEHICLE SYSTEM

(75) Inventors: Toshikazu Kizawa, Kariya-hi (JP); Tomoya Okuno, Nishio (JP)

(73) Assignee: Denso Corporation, Kariya (JP)

( * ) Notice: Subject to any disclaimer, the term of this patent is extended or adjusted under 35 U.S.C. 154(b) by 463 days.

(21) Appl. No.: 12/379,866

(22) Filed: Mar. 3, 2009

(65) Prior Publication Data
US 2009/0224600 A1     Sep. 10, 2009

(30) Foreign Application Priority Data
Mar. 7, 2008 (JP) .................. 2008-058344

(51) Int. Cl.
H02P 9/00 (2006.01)
H02P 11/00 (2006.01)
H02H 7/06 (2006.01)

(52) U.S. Cl. ................ 322/28; 322/25; 322/33; 322/99; 307/9.1; 310/68 C; 310/68 R

(58) Field of Classification Search .................. 322/25, 322/28, 33, 99; 307/9.1; 310/68 C, 68 R; H02P 9/00, 11/00; H02H 7/06
See application file for complete search history.

(56) References Cited

U.S. PATENT DOCUMENTS

| 5,719,485 A * | 2/1998 | Asada ............................. 322/28 |
| 2003/0042875 A1* | 3/2003 | Okamoto et al. ............... 322/28 |
| 2005/0206350 A1* | 9/2005 | Inokuchi et al. ................ 322/28 |
| 2006/0181248 A1* | 8/2006 | Aoyama ......................... 322/28 |
| 2006/0186862 A1* | 8/2006 | Takahashi ....................... 322/28 |
| 2008/0191482 A1* | 8/2008 | Okuno .............................. 290/7 |
| 2009/0224600 A1* | 9/2009 | Kizawa et al. ................. 307/9.1 |

FOREIGN PATENT DOCUMENTS

| JP | A-05-300669 | 11/1993 |
| JP | A-2007-325361 | 12/2007 |
| JP | A-2008-199779 | 8/2008 |

OTHER PUBLICATIONS

Dec. 22, 2009 Office Action issued in Japanese Patent Application No. 2008-058344 (with translation).

* cited by examiner

*Primary Examiner* — John K Kim
(74) *Attorney, Agent, or Firm* — Oliff & Berridge, PLC

(57) ABSTRACT

A switching element, a duty deciding circuit, an LRC circuit, a voltage detecting circuit, and an LRC limit value deciding circuit are included. The switching element 58 outputs a duty factor of a field winding of a vehicle power generator towards an ECU, via an FR terminal. The duty deciding circuit limits a speed at which the duty factor of the field winding increases to a predetermined limit value. The voltage detecting circuit detects a voltage at the FR terminal. The LRC limit value deciding circuit switches the limit value of the speed at which the duty factor increases based on the voltage value detected by the voltage detecting circuit.

5 Claims, 2 Drawing Sheets

VEHICLE POWER GENERATION CONTROLLING DEVICE AND VEHICLE SYSTEM

CROSS-REFERENCE TO RELATED APPLICATION

This application is based on and claims the benefit of priority from earlier Japanese Patent Application No. 2008-58344 filed Mar. 7, 2008, the description of which is incorporated herein by reference.

BACKGROUND OF THE INVENTION

1. Technical Field of the Invention

The present invention relates to a vehicle power generation controlling device and a vehicle system, in which the vehicle generation controlling device controls a power generation state of a vehicle power generator mounted on a passenger car, a truck, and the like.

2. Description of the Related Art

A vehicle power generation controlling device detects a voltage at a control terminal (a plus terminal of a battery or an output terminal) and compares the detected voltage with a reference value. When the voltage at the control terminal is higher than the reference value, the vehicle power generation controlling device turns OFF a transistor that controls ON/OFF of a field current. On the other hand, when the voltage is lower than the reference value, the vehicle power generation controlling device turns ON the transistor. As a result, the vehicle power generation controlling device controls a duty factor of a field winding and controls the voltage at the control terminal to maintain the voltage at a constant value.

When an electrical load is applied, electric current of an amount corresponding to the applied electrical load is taken from a battery. An amount by which the voltage drops as a result of the electric current being taken is controlled such that the voltage at the control terminal is a regulated voltage, by the duty factor of the field winding being increased and an amount of generated power being increased. The control is performed instantly. Therefore, voltage drop at the control terminal is minimal, and the voltage is maintained at an almost constant value. However, at this time, a power generation torque of the vehicle power generator suddenly increases because of the sudden increase in the field current of the vehicle power generator. As a result, engine speed decreases. In an idle rotation range in particular, the engine may stall as a result of the decrease in the engine speed.

As a conventional technology for preventing a phenomenon such as this from occurring, for example, a following method is disclosed in Japanese Patent Application Laid-Open Publication No. 5-300669. In the method, speed at which the duty factor of the field winding increases is restricted when the field current increases, thereby suppressing a sudden increase in the power generation torque of the vehicle power generator. This method is a function for suppressing power generation by the vehicle power generator. Therefore, although torque variations can be suppressed, the amount of generated power becomes insufficient while this function is running and output voltage from the vehicle power generator drops.

In the conventional method disclosed in Japanese Patent Application Laid-Open Publication No. 5-300669, the output voltage drops as a result of the restriction to the speed at which the duty factor of the field winding is increased when the electrical load is applied. As a result, a problem occurs in that, when headlamps are illuminated, the headlamps may flicker.

When deceleration occurs while the output current is in a constant state, the vehicle power generator performs control to increase the field current to maintain the output current. Whether the above-described function for suppressing the speed at which the field current increases runs during deceleration is decided based on whether an amount of increase in the field current required as a result of deceleration is greater than a limit value of the speed at which the field current increases. In other words, when a degree of deceleration of a vehicle is large (when a deceleration rate during deceleration is large), the amount of increase in the field current required as a result of deceleration becomes large. A possibility that the amount of increase in the field current is greater than the limit value of the speed at which the field current can increase becomes high. Therefore, the probability of the above-described function for suppressing the rate of increase of the field current being activated becomes high.

Therefore, when a vehicle on which the vehicle power generator having the function for suppressing the speed at which the field current increases is mounted decelerates, the function for suppressing the speed at which the field current increases may run even when the electrical load is constant. Variations in engine speed are suppressed as a result of the function running. However, the output voltage drops. Therefore, when the vehicle decelerates while the headlamps are turned on, the headlamps flicker because of the drop in output voltage.

SUMMARY OF THE INVENTION

The present invention has been achieved in light of the above-described issues. An object of the present invention is to provide a vehicle power generation controlling device and a vehicle system, in which the vehicle power generation controlling device can prevent headlamps, interior lamps, and the like from flickering when an electrical load is applied and when a vehicle decelerates.

To solve the above-described issues, the vehicle power generation controlling device of the present invention includes a duty factor outputting means, a duty factor increase speed limiting means, a voltage detecting means, and a limit value deciding means. The duty factor outputting means outputs a duty factor of a field winding in a vehicle power generator towards an external control unit, via a duty factor output terminal. The duty factor increase speed limiting means limits a speed at which the duty factor of the field winding increases to a predetermined limit value. The voltage detecting means detects a voltage at the duty factor output terminal. The limit value deciding means switches the limit value depending on a voltage value detected by the voltage detecting means.

The voltage at the terminal (duty factor output terminal) outputting the duty factor of the field winding can be detected and the limit value of the speed at which the duty factor of the field winding increases can be switched. Therefore, when the external control unit changes the voltage value at the duty factor output terminal when lamps are illuminated, the changed voltage is detected and the limit value of the speed at which the duty factor increases is switched to a large value. As a result, the increase in field current when an electrical load is applied and when deceleration occurs is not restricted. Flickering of headlamps and interior lamps caused by a drop in output voltage can be prevented.

The above-described voltage detecting means preferably detects a voltage at the duty factor output terminal when a voltage level is high. The voltage at the duty factor output terminal when the voltage level is high can be detected, and the limit value of the speed at which the duty factor of the field winding increases can be switched based on the detected value. Therefore, the limit value of the speed at which the duty factor increases can be switched while maintaining a function for outputting the duty factor.

A vehicle system of the present invention includes the above-described vehicle power generation controlling device and an external control unit. The external control unit detects an ON/OFF state of a lamp load, and switches a voltage value of a power supply connected to the duty factor output terminal based on a detection result. As a result, the limit value of the speed at which the duty factor increases can be switched to a large value when the lamp load is activated. Flickering of the lamp load (headlamps and internal lamps) caused by a drop in output voltage from the vehicle power generator can be prevented.

The above-described duty factor outputting means is preferably a switching element provided between the duty factor output terminal and a ground terminal. The external control unit preferably switches a voltage value of a power supply connected to a pull-up resistor that terminates a signal line connected to the duty factor output terminal, depending on the ON/OFF state of the lamp load. As a result, the voltage value at the duty factor output terminal can be switched by the external control unit side using a simple configuration.

The above-described limit value deciding means preferably switches the limit value to a large value when the external control unit detects an ON state of the lamp load and the voltage detecting means detects that the voltage value of the power supply connected to the duty factor output terminal has been switched. As a result, the increase in the field winding when the lamp load is applied is not restricted. Flickering of the headlamps and the interior lamps caused by the drop in output voltage can be prevented.

DETAILED DESCRIPTION OF THE PREFERRED EMBODIMENTS

Figure 1:
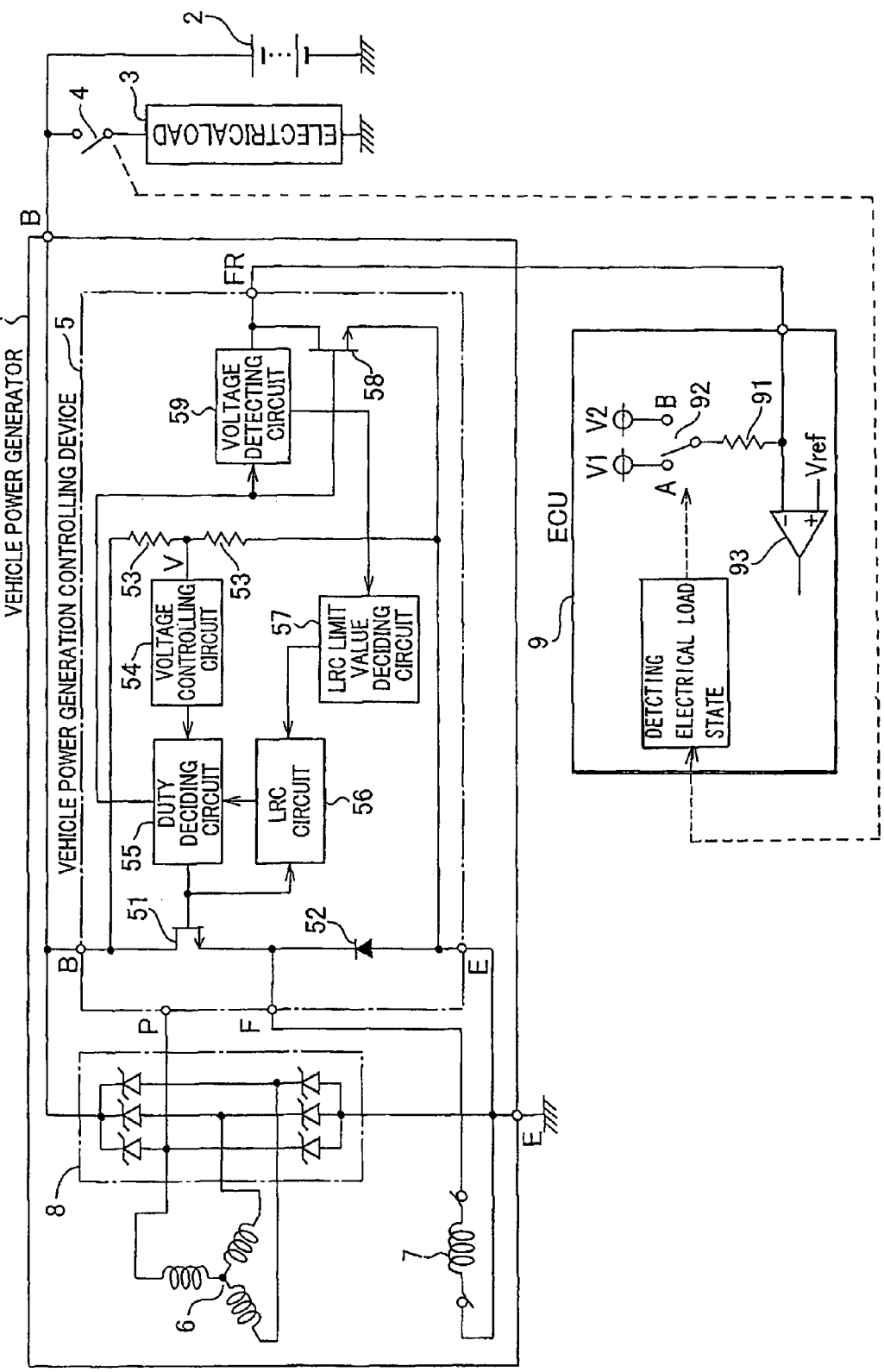
FIG. 1 shows a diagram of a configuration of a vehicle system according to an embodiment.

An embodiment of a vehicle system to which the present invention is applied will be described in detail with reference to the attached drawings. FIG. 1 is a diagram of a configuration of the vehicle system according to the embodiment. Connection states between a vehicle power generator on which a vehicle power generation controlling device is mounted, an external control unit (ECU), a battery, an electrical load, and the like is shown.

As shown in FIG. 1, a vehicle power generator 1 according to the embodiment includes a vehicle power generation controlling device 5, an armature winding 6, a field winding 7, and a rectifier 8. The vehicle power generator 1 is driven by an engine using a belt and a pulley. The field winding 7 is energized and generates a magnetic field. The field winding 7 is wound around a field pole (not shown) and forms a rotor. The armature winding 6 is a poly-phase winding (for example, a three-phase winding). The armature winding 6 is wound around an armature core and forms an armature. The armature winding 6 generates an electromotive force as a result of change in the magnetic field generated by the field winding 7. An alternating current output induced in the armature winding 6 is supplied to the rectifier 8. The rectifier 8 performs full-wave rectification on the alternating current from the armature winding 6. An output from the rectifier 8 is outputted externally from a B terminal, as an output from the vehicle power generator 1. The output from the vehicle power generator 1 is supplied to an electrical load 3, via a battery 2 or an electrical load switch 4. The output from the vehicle power generator 1 changes depending on the rotor speed and an amount of electrification of the field current flowing through the field winding 7. The field current is controlled by the vehicle power generation controlling device 5.

Next, the vehicle power generation controlling device 5 will be described in detail. The vehicle power generation controlling device 5 includes switching elements 51 and 58, a reflux diode 52, a voltage dividing circuit 53, a voltage controlling circuit 54, a duty deciding circuit 55, a load response control (LRC) circuit 56, an LRC limit value deciding circuit 57, and a voltage detecting circuit 59. The switching element 58 corresponds to a duty factor outputting means. The duty deciding circuit 55 and the LRC circuit 56 correspond to a duty factor increase speed limiting means. The voltage detecting circuit 59 corresponds to a voltage detecting means. The LRC limit value deciding circuit 57 corresponds to a limit value deciding means.

A gate of the switching element 51 is connected to the duty deciding circuit 55. A drain is connected to the B terminal of the vehicle power generator 1. A source is connected to an E terminal (grounding terminal) via the reflux diode 52. The source of the switching element 51 is also connected to the field winding 7, via an F terminal. When the switching element 51 is turned ON, the field current flows through the field winding 7. When the switching element 51 is turned OFF, electrification stops. The reflux diode 52 is connected in parallel with the field winding 7. When the switching element 51 is turned OFF, the field current flowing through the field winding 7 is recycled.

The voltage dividing circuit 53 includes two resistors. The voltage dividing circuit 53 divides the output voltage from the vehicle power generator 1 (or a terminal voltage of the battery 2) (the divided voltage is referred to as "detection voltage V"). The voltage controlling circuit 54 compares the detection voltage V with a predetermined reference voltage. When the detection voltage V is lower than the reference voltage, the voltage controlling circuit 54 outputs a high-level signal. The voltage controlling circuit 54 outputs a low-level signal when the detection voltage V is higher than the reference voltage.

The duty deciding circuit 55 decides a duty ratio (duty factor of the field winding 7) for controlling the ON/OFF of the switching element 51, in correspondence with the output signal from the voltage controlling circuit 54. The duty deciding circuit 55 also drives the switching element 58 using the duty ratio controlling the ON/OFF of the switching element 51. A gate of the switching element 58 is connected to the duty deciding circuit 55. A drain is connected to an FR terminal. A source is grounded via the E terminal. The source of the switching element 51 is also connected to the field winding 7, via an F terminal. Within an ECU 9 connected via the FR terminal, a signal line connected to the FR terminal is connected to a predetermined power supply line via a pull-up resistor. Therefore, when the signal outputted from the duty deciding circuit 55 is held high, a voltage level at the FR terminal is low. On the other hand, when the signal outputted from the duty deciding circuit 55 is held low, the voltage level at the FR terminal is high. As a result, a signal indicating the duty factor is sent from the FR terminal to the ECU 9 by the switching element 58 being driven (ON/OFF control) by the duty ratio corresponding to the duty factor of the field winding 7.

The voltage detecting circuit 59 detects the voltage at the FR terminal. The voltage is detected when the voltage level at the FR terminal is high. The voltage at the FR terminal is switched between multiple stages (such as two stages) depending on a running state of the vehicle and an electrical load state. The voltage is switched by the ECU 9 that detects the running state of the vehicle and the electrical load state. Details thereof will be described hereafter.

The LRC limit value deciding circuit 57 decides a limit value (the limit value is referred to as "duty increase limit value") for the speed at which the duty factor (duty) of the field winding 7 increases, based a voltage value at the FR terminal detected by the voltage detecting circuit 59. The LRC circuit 56 decides a new target duty based on the duty increase limit value decided by the LRC limit value deciding circuit 57 and the value of the current duty decided by the duty deciding circuit 55. When the target duty is inputted, the duty deciding circuit 55 changes the previous duty to the target duty.

Next, the ECU 9 will be described. The ECU 9 includes a pull-up resistor 91, a switch 92, and a voltage comparator 93. The pull-up resistor 91 terminates the signal line connected to the FR terminal of the vehicle power generation controlling device 5. The switch 92 selectively connects one of a terminal A, connected to a power supply of a voltage V1, and a terminal B, connected to a power supply of a voltage V2, to one end of the pull-up resistor 91.

The connection state is switched based on detection results of the driving state of the vehicle and the electrical load state. The ECU 9 is an external control unit that performs engine control and the like. The ECU 9 provides a function for detecting the running state of the vehicle and the electrical load state to perform engine control. The signal line connected to the FR terminal is connected to a minus terminal of the voltage comparator 93. A reference voltage Vref is applied to a plus terminal. The voltage comparator 93 compares the voltage at the FR terminal with the reference voltage Vref, thereby detecting the duty factor sent from the vehicle power generation controlling device 5, via the FR terminal.

Figure 2:
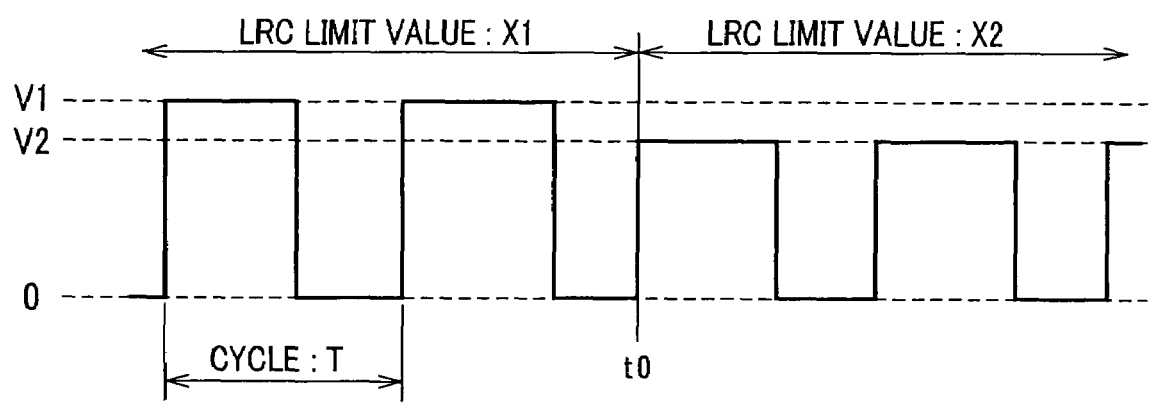
FIG. 2 shows a diagram of signal waveforms indicating duty factor transmitted and received between a vehicle power generation controlling device and an ECU.

FIG. 2 is a diagram of signal waveforms indicating the duty factor transmitted and received between the vehicle power generation controlling device 5 and the ECU 9. For example, until time t0, the switch 92 is connected to the terminal A side. The FR terminal is connected to the power supply of the voltage V1 via the pull-up resistor 91. Therefore, the signal transmitted from the FR terminal towards the ECU 9 has a low voltage level of 0V and a high voltage level of V1. The signal is that of the duty corresponding to the duty factor of the field winding 7.

After time t0, the switch 92 is connected to the terminal B side. The FR terminal is connected to the power supply of the voltage V2 (<V1) via the pull-up resistor 91. Therefore, the signal transmitted from the FR terminal towards the ECU 9 has a low level of 0V and a high level of V2. The signal is that of the duty corresponding to the duty factor of the field winding 7.

A specific example is described below. The voltage V1 of the power supply connected to the terminal A of the ECU 9 is 12V. The voltage of the power supply connected to the terminal B is 8V. When the electrical load (lamp load) 3, such as the headlamps and interior lamps of the vehicle, is applied, the ECU 9 switches the switch 92 to the terminal B side. When the electrical load 3 is not applied, the ECU 9 switches the switch 92 to the terminal A side.

In this instance, the high-level voltage at the FR terminal detected by the voltage detecting circuit 59 of the vehicle power generation controlling device 5 is 8V when the electrical load 3, such as the headlamps and interior lamps of the vehicle, is applied. The high-level voltage is 12V when the electrical load 3 is not applied. The LRC limit value deciding circuit 57 uses 10V as a threshold value and judges whether the voltage at the FR terminal is lower or higher. When the voltage at the FR terminal is lower than 10V, the LRC limit value is 1000%/s. When the voltage at the FR terminal is higher than 10V, the LRC limit value is switched to 33.3%/s. As a result, when the electrical load 3, such as the headlamps and interior lamps of the vehicle, is applied, the LRC is not easily activated because the limit value of the LRC is high. Voltage drop, i.e. flickering of lamps, caused by the LRC being activated can be prevented.

In this way, in the vehicle system according to the embodiment, the voltage at the FR terminal outputting the duty factor of the field winding 7 can be detected, and the limit value of the speed at which the duty factor of the field winding 7 is increased can be switched. Therefore, when the ECU 9 changes the voltage value at the FR terminal when lamps are illuminated, the changed voltage can be detected, and the limit value of the speed at which the duty factor is increased can be switched to a large value. As a result, the increase in the field current is not restricted when the electrical load is applied and when deceleration occurs. Flickering of the headlamps and interior lamps caused by the drop in output voltage can be prevented.

The voltage at the FR terminal when the voltage level is high and when the voltage level is low is detected. The limit value of the speed at which the duty factor of the field winding increases is switched based on the voltage value. Therefore, the limit value of the speed at which the duty factor increases can be switched while maintaining the output function of the duty factor provided by the vehicle power generation controlling device 5.

The limit value of the speed at which the duty factor increases can be switched to a large value when the lamp load is activated. Therefore, flickering of the lamp load caused by the drop in output voltage of the vehicle power generator 1 can be prevented.

The present invention is not limited to the above-described embodiment. Various modifications can be made within the spirit of the invention. According to the above-described embodiment, the voltage at the FR terminal is switched between two stages. However, the voltage can be switched between multiple stages of three or more, and the LRC limit value deciding circuit 57 can set the limit value based on each voltage value.

What is claimed is:

1. A vehicle power generation controlling device comprising:
    a duty factor outputting means that outputs a duty factor of a field winding in a vehicle power generator towards an external control unit, via a duty factor output terminal;
    a duty factor increase speed limiting means that limits a speed at which the duty factor of the field winding increases to a predetermined limit value;
    a voltage detecting means that detects switching of a voltage value of a power supply connected to the duty factor output terminal: and
    a limit value deciding means that switches the limit value depending on a voltage value detected by the voltage detecting means.

2. The vehicle power generation controlling device according to claim 1, wherein the voltage detecting means detects a voltage at the duty factor output terminal when a voltage level is high.

3. A vehicle system comprising:
a vehicle power generation controlling device comprising:
a duty factor outputting means that outputs a duty factor of a field winding in a vehicle power generator towards an external control unit, via a duty factor output terminal, wherein the external control unit detects an ON/OFF state of a lamp load, and switches a voltage value of a power supply connected to the duty factor output terminal based on a detection result;
a duty factor increase speed limiting means that limits a speed at which the duty factor of the field winding increases to a predetermined limit value;
a voltage detecting means that detects switching of a voltage value of a power supply connected to the duty factor output terminal, when a voltage level is high; and
a limit value deciding means that switches the limit value depending on a voltage value detected by the voltage detecting means.

4. The vehicle system according to claim 3, wherein:
the duty factor outputting means is a switching element provided between the duty factor output terminal and a ground terminal; and
the external control unit switches a voltage value of a power supply connected to a pull-up resistor that terminates a signal line connected to the duty factor output terminal, depending on the ON/OFF state of the lamp load.

5. The vehicle system according to claim 4, wherein:
the limit value deciding means switches the limit value to a large value when the external control unit detects an ON state of the lamp load.

* * * * *